US 6,704,289 B1

(12) United States Patent
D'Souza et al.

(10) Patent No.: US 6,704,289 B1
(45) Date of Patent: Mar. 9, 2004

(54) METHOD FOR MONITORING SERVICE AVAILABILITY AND MAINTAINING CUSTOMER BANDWIDTH IN A CONNECTIONLESS (IP) DATA NETWORK

(75) Inventors: Kevin L D'Souza, Pittsburgh, PA (US); Yaakov Kogan, Fair Haven, NJ (US); Gangaji Maguluri, Morganville, NJ (US); Gomathi Ramachandran, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/409,637

(22) Filed: Oct. 1, 1999

(51) Int. Cl.[7] .......................... H04L 12/26; H04L 12/28; G06F 15/173
(52) U.S. Cl. ...................... 370/252; 370/242; 370/254; 709/224
(58) Field of Search ................................. 370/242, 252, 370/244, 253, 245, 216, 254, 255; 709/229, 223, 224

(56) References Cited

U.S. PATENT DOCUMENTS

| | | | | |
|---|---|---|---|---|
| 5,477,531 A | * | 12/1995 | McKee et al. | 370/249 |
| 5,812,529 A | * | 9/1998 | Czarnik et al. | 370/245 |
| 5,867,483 A | * | 2/1999 | Ennis et al. | 370/252 |
| 5,946,373 A | * | 8/1999 | Harris | 379/14.01 |
| 6,041,039 A | * | 3/2000 | Kilkki et al. | 370/230 |
| 6,173,324 B1 | * | 1/2001 | D'Souza | 709/224 |
| 6,363,056 B1 | * | 3/2002 | Beigi et al. | 370/252 |
| 6,490,621 B1 | * | 12/2002 | Forget et al. | 709/224 |

OTHER PUBLICATIONS

U.S. patent application Ser. No. 09/271,715, filed Mar. 18, 1999, Method For Measuring The Availability Of Router-Based Connectionless Networks (D'Souza, K.L.).

* cited by examiner

Primary Examiner—Hassan Kizou
Assistant Examiner—Timothy Lee

(57) ABSTRACT

Unavailable customer bandwidth in a connectionless IP network (100) is determined by first measuring network accessibility and network continuity (in Defects Per Million) via an accessibility measurement instrumentation device (202) and a continuity measurement instrumentation device (204). The accessibility and continuity measurements are combined via a mechanism (206) to yield a service unavailability measure that is then compared to a threshold value, representing the applicable customer unavailable bandwidth specified under an service level agreement specification (210). If the actual service unavailability exceeds the allowable unavailable customer bandwidth under the service level agreement, then an event correlation device (212) will correlate the service unavailability measure with network fault and performance alarm information from network alarms (216) to establish a root cause. Once the route cause is established, a trouble ticket system (218) generates a trouble ticket to facilitate network restoration.

16 Claims, 3 Drawing Sheets

100

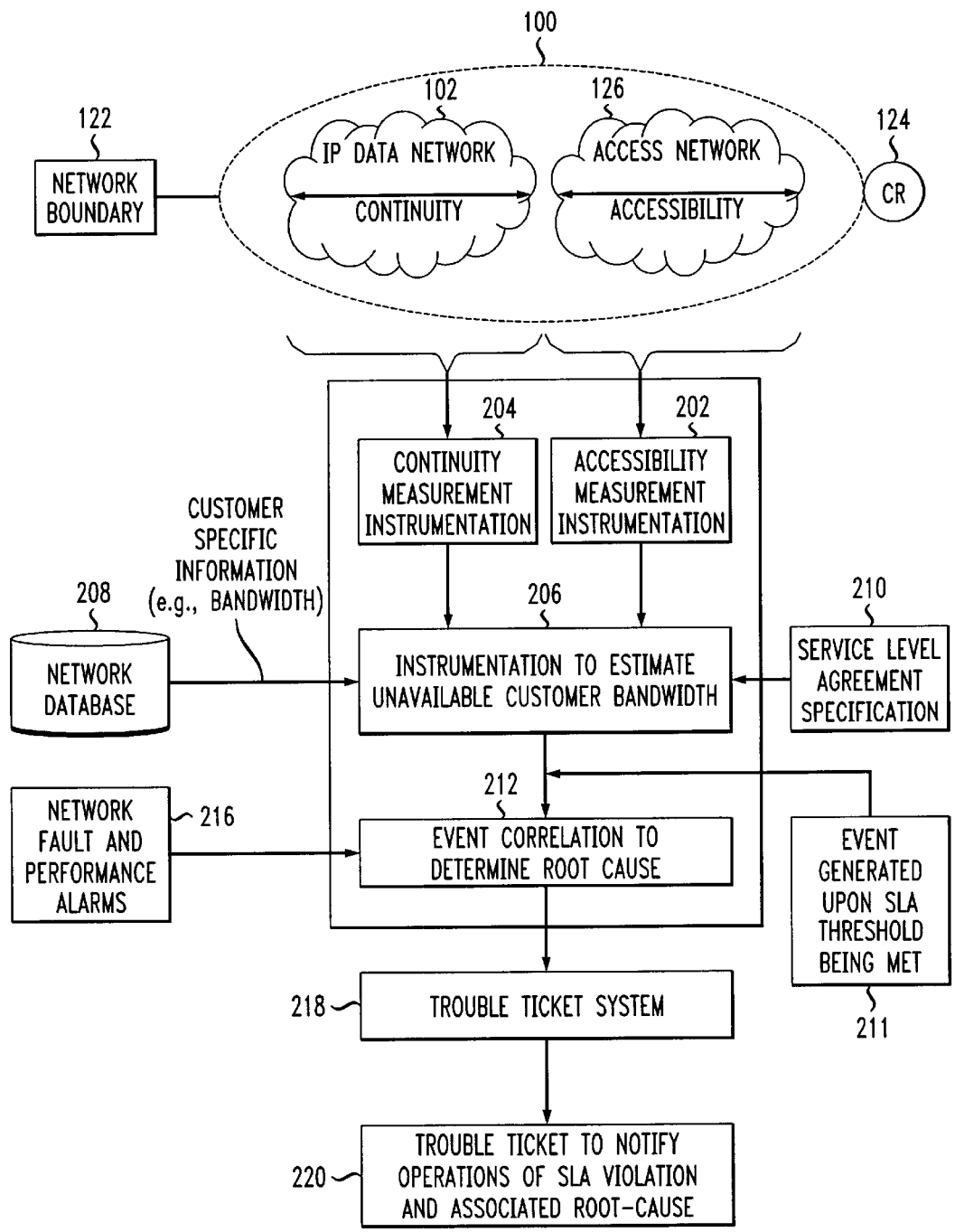

METHOD FOR MONITORING SERVICE AVAILABILITY AND MAINTAINING CUSTOMER BANDWIDTH IN A CONNECTIONLESS (IP) DATA NETWORK

TECHNICAL FIELD

This invention relates to a technique for determining the service availability in a connectionless network, such as an Internet Protocol network, to facilitate restoration of lost bandwidth.

BACKGROUND ART

Data networks, such as those maintained by communications service providers like AT&T, generally fall in the category of "connection-based or "connectionless" networks depending whether the path traversed by packets is known in advance of transmission. Connection-based data networks, such as those providing traditional Frame Relay Service, typically have Permanent Virtual Circuits (PVCs) that link network elements. Thus, in a traditional connection-based data network, each packet in a data stream passing between the same pair of network elements traverses the same PVC. By contrast, in connectionless data networks, and particularly Internet Protocol (IP) data networks, multiple paths typically exist between each origin and destination. Often different packets within the same data stream will traverse different-paths. Unlike a connection-based data network in which the transmission path is known in advance, no advance knowledge usually exists about the path traversed by each packet in a connection-less data network.

The lack of apriori knowledge of the transmission path, and the fact that connectionless IP networks often possess a wide range of access bandwidths, makes the task of estimating unavailable end-to-end customer bandwidth difficult. The unavailability of a particular path in a connectionless data network may or may not affect the transmission of packets, and may or may not affect customer bandwidth, depending on the availability of other paths within the network. In contrast, estimating unavailable customer bandwidth in a connection-based Frame Relay Service or ATM network is simply a matter of measuring the number of PVC outages that last more than a prescribed interval.

In the past, some network service providers attempted to gauge unavailable customer bandwidth in connectionless data networks by launching "pings" to probe network connectivity. The ratio of pings not received at a customer premise to the total number of pings sent within the interval of testing will provide a measure of unavailable customer bandwidth. However, sending frequent pings across the network consumes network resources. Thus, attempting to measure unavailable customer bandwidth in this manner can actually impair performance.

Thus, there is a need for a measuring unavailability in a connectionless data network that overcomes the disadvantages of the prior art.

BRIEF SUMMARY OF THE INVENTION.

Briefly, the present invention provides a technique for determining unavailable customer bandwidth in a connectionless IP network and for restoring bandwidth when the unavailable customer bandwidth exceeds a prescribed level. In other words, the present invention substantially maintains the ability of a customer to transmit data through the network at a specified service level. To maintain customer bandwidth, the technique of the invention first establishes (measures) network accessibility and continuity. Network accessibility is defined as the availability of the network to receive a packet from a customer router at an network ingress point. Network continuity is defined as the ability of the network to deliver to an egress point a customer packet received at the network ingress point. The service availability of the network is then determined in accordance with the previously established accessibility and continuity values. The actual service availability is compared to a desired service availability. If the desired service availability exceeds the actual service availability, the customer bandwidth is restored, either by way of repair, adjustment, modification or enhancement to the network.

BRIEF DESCRIPTION OF THE DRAWINGS

FIG. 3 is a system, in accordance with the invention for substantially maintaining customer bandwidth.

DETAILED DESCRIPTION

Figure 1:
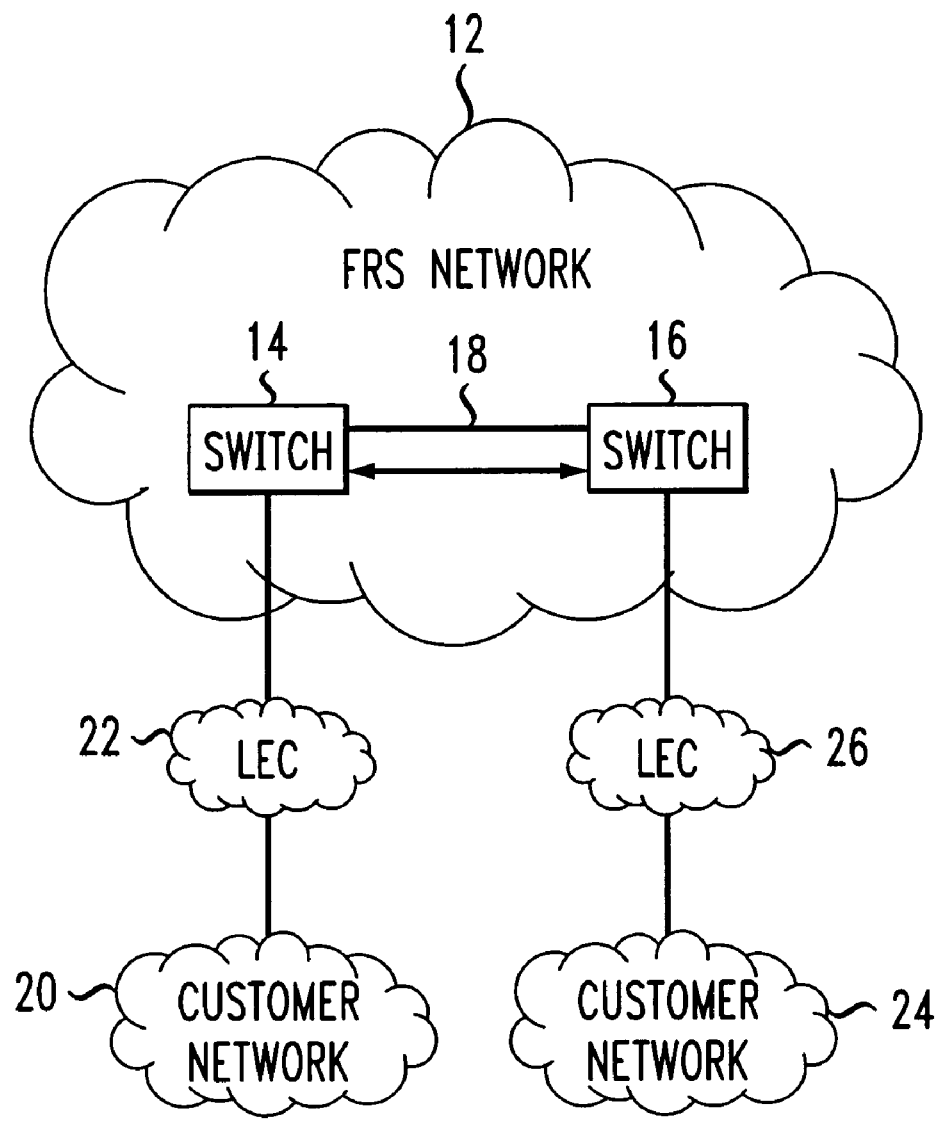
FIG. 1 depicts a block schematic diagram of a prior-art connection-based data network.

To better appreciate the technique of the present invention for substantially maintaining customer bandwidth, a brief discussion of connection-based and connectionless data networks may prove useful. FIG. 1 illustrates a block schematic diagram of a simplified connection-based data network 10, which, in the illustrated embodiment, includes a Frame-Relay Service (FRS) backbone 12, such as the FRS backbone maintained by AT&T. For purposes of simplicity, the FRS backbone 12 in the illustrated embodiment includes only a single ingress switch 14 and single egress switch 16 linked by a Permanent Virtual Circuit 18. (In practice, the FRS backbone 12 would typically include a plurality of switches linked by a plurality of PVCs.). The ingress switch 14 receives traffic, in the form of a stream of data packets, from a first customer network 20 connected to the ingress switch via communication channel that may include a first Local Exchange Carrier(LEC) network 22. Conversely, the egress switch 16 within the FRS backbone 12 delivers traffic received from the ingress switch to a second customer network 24 connected to the egress switch via a second communication channel 26 in the form of a second LEC network.

The FRS backbone network 12 constitutes a connection-based network because each packet in the data stream passing between the ingress and egress switches 14 and 16 traverses the same PVC 18. In other words, the data path between the ingress and egress switches 14 and 16 is known apriori. Given that all packets within the same data stream passing between network elements traverse the same PVC, measuring unavailable customer bandwidth simply becomes a matter of measuring the extent of PVC outage over a prescribed period, say every minute.

Figure 2:
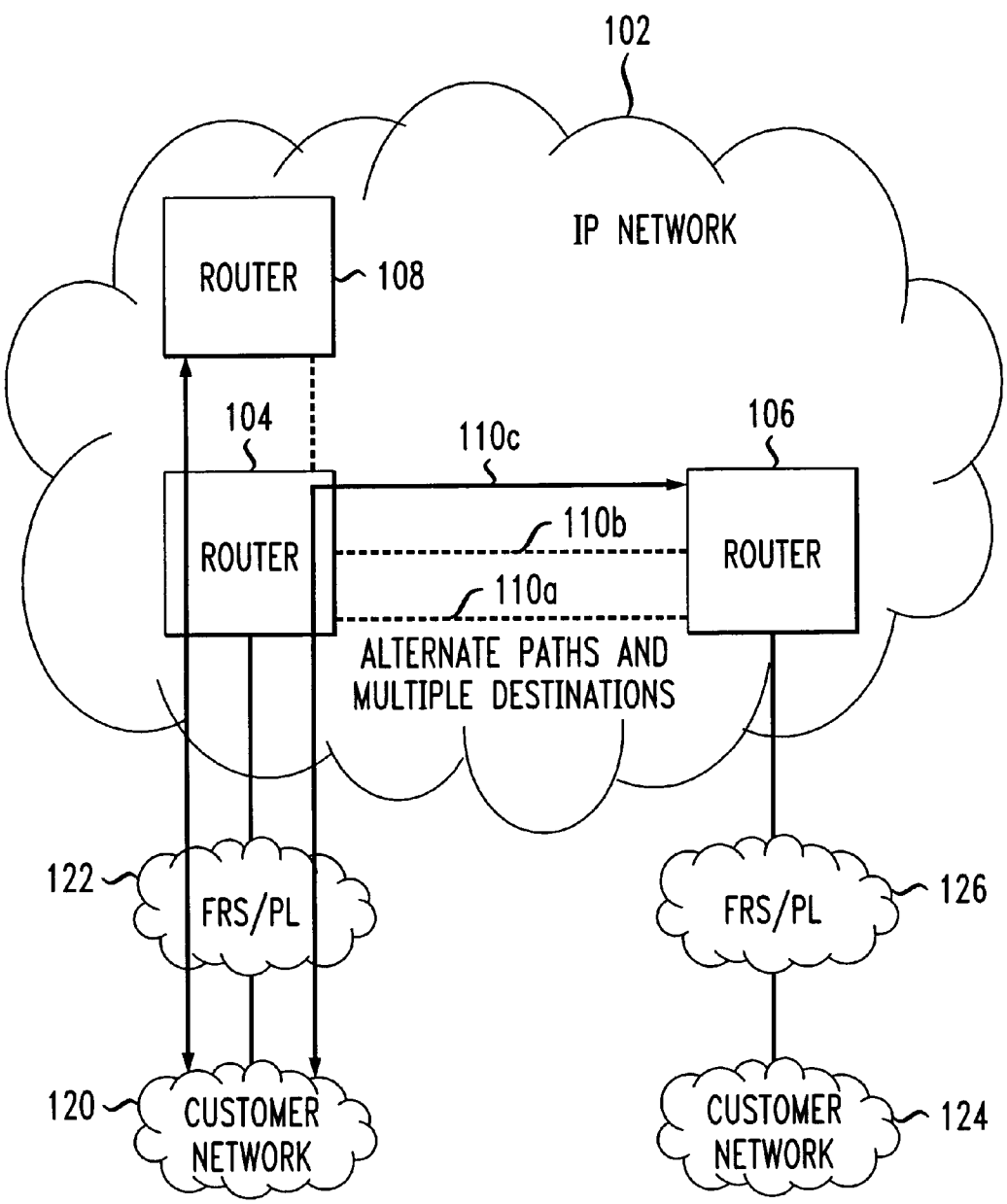
FIG. 2 is a block schematic diagram of a prior-art connectionless data network.

FIG. 2 illustrates a block schematic diagram of a connection-less data network 100 according to the prior art. In contrast to the network 10 of FIG. 1, the data network 100 of FIG. 2 has an Internet protocol backbone 102 that includes a plurality of access routers 104, 106 and 108, for example. (In practice, a typical IP backbone would include a large plurality of such routers) Multiple paths typically exist between the access routers 104, 106 and 108 within the network 102. For example, paths 110a, 110b and 110c exist between the routers 104 and 106. The access router 104 receives traffic, in the form of a stream of data packets, from a first customer network 120 through a Frame Relay Network or private line 122, and routes such traffic to the access router 106. In turn, the access router 106 routes the traffic received from the access router 104 to a second customer network 124 through a Frame Relay network or private line 126.

In contrast to the connection-based network 10 of FIG. 1 in which outage measurement is a straightforward task, determining unavailable bandwidth in the connectionless network 100 of FIG. 2 is more problematic. Simply measuring the outage of a path, such as path 110a between routers 104 and 106, will not necessarily yield an accurate measure of bandwidth unavailability because other paths, such as paths 110b and 110c, may or may not be available.

To overcome the aforementioned disadvantage, FIG. 3 depicts a system 200 in accordance with the invention, for determining the service availability, and by implication unavailable customer bandwidth, in a connectionless network, such as the network 100, to facilitate restoration of lost bandwidth. As discussed in greater detail below, the system 200 of the invention measures network accessibility and network continuity. From the accessibility and continuity measurements, the system 200 obtains an estimate of unavailable bandwidth from which event correlation can occur to determine the root cause of the failure so that appropriate action can occur to restore the network.

For purposes of discussion, network accessibility is defined as the ability of the connectionless network backbone, e.g., the backbone network 102 of FIG. 2, to receive at an ingress point a customer data packet via the access network 122. Network continuity is the ability of the backbone network 102 to deliver to a network egress point (e.g., network boundary 106 or 108), a customer packet received at the ingress point (e.g. at network boundary 104). To make measurements of network accessibility and network continuity, the system 200 includes an accessibility measurement instrumentation device 202 and a continuity measurement instrumentation device 204, respectively. The devices 202 and 204 are comprised of a combination of receptors (not shown) for receiving information from the access network 122 and the backbone network 102, respectively. The receptors collect and process accessibility and continuity information respectively, to yield accessibility and continuity measurements.

The network accessibility and continuity measurements made by the accessibility and continuity measurement instrumentation devices 202 and 204, respectively, are received by an instrumentation device 206, in the form of a processor or the like. (Note that the accessibility and continuity measurement instrumentation devices 202 and 204 and the device 206 could comprise a single unit, such as a computer, running one or more programs, either locally, or via a network connection.) As discussed below, the processor 206 estimates unavailable customer bandwidth in accordance with the accessibility and continuity measurements, and thereafter determines whether the unavailable customer bandwidth is below that required under an applicable service level agreement. To that end, the processor 206 enjoys a connection to a database 208 that stores customer specific information to facilitate determining customer bandwidth unavailability. In addition, the processor 206 also enjoys a link to a second database 210 that stores information regarding customer service level agreement specifications. Note that the information stored in the separate databases 208 and 210 could reside on a single database.

Upon determining that the customer unavailable bandwidth remains at or above the level specified by the applicable service level agreement, the processor 206 will send a signal as illustrated in mechanism 211 to indicate that such a threshold is being met. The signaling mechanism 211 may comprise part of the processor 206 or a separate element or group of elements for providing such an indication that the threshold level is being met. For example, the element 211 could comprise a display for providing a visual display of information generated by the processor 206 that the customer unavailable bandwidth remains within applicable levels.

In the event that the customer unavailable bandwidth exceeds the threshold set by the applicable service level agreement, then the processor 206 signals an event correlation mechanism 212 (comprising part of the processor, or a separate device) to determine the root cause of the problem. To detect the root cause of the problem, the event correlation mechanism receives and scrutinizes network fault and performance information for network fault and performance alarms 216. The event correlation mechanism 216 may comprise a rule-based system (i.e., a processor that executes a program) that analyzes incoming data in accordance with a set of prescribed rules that dictate a certain result (i.e., a "root-cause") in accordance with given set of input conditions. For example, upon detecting a network alarm associated with an inoperative access router, such as router 106, in FIG. 2, that serves as a network gateway, the event correlation mechanism 212 would correlate this event to the root cause of the problem.

Upon determining the route cause, the event correlation mechanism 212 signals a trouble ticket system 218 to generate a trouble ticket 220 to notify network operations personnel of a violation of the applicable service level agreement. In its simplest form, the trouble ticket system 218 could comprise a printer for printing a physical ticket. Alternatively, the trouble ticket system 218 could comprise a database management system for issuing, recording and tracking individual trouble tickets 220. From the trouble ticket, network personnel would then restore customer bandwidth by way of repair, adjustment, modification or enhancement to the network.

The accessibility measurement made by the device 202 represents accessibility in terms of the fractional accessibility for Bandwidth Bw(i) which is defined as the total outage time for customers of Bandwidth Bw(i) divided by the number of customers with that bandwidth multiplied by the time interval considered. To define that relationship mathematically, the following parameters are defined as follows.

N is total number of access routers (ARs), such as routers 104 and 106 of FIG. 2.

Bw(1), . . . , Bw(M) is the bandwidth set of customer access ports.

n(i,j) is the number of access ports with bandwidth Bw(i) at ARj

Thus the total number of ports with bandwidth Bw(i) is given by $$n(i) = \sum_{j=1}^{N} n(i, j) \qquad \text{Equation 1}$$

The total access bandwidth (TAB) for the IP backbone 102 of FIG. 2 is then given by $$TAB = \sum_{i=1}^{M} n(i)Bw(i) \qquad \text{Equation 2}$$

The calculation of Defects Per Million in accessibility, continuity and availability is based on measurements of the following variables.

$t_l(i,j,k)$ is the duration of outage for the $l^{th}$ outage event in chronological order for the $k^{th}$ port with bandwidth $Bw(i)$ on router j. Then the sum of outages for the access ports $$t_l(i, j) = \sum_k t_l(i, j, k) \qquad \text{Equation 3}$$

of $Bw(i)$ on router j is given by Summing over all routers j gives the time of outage, $t_l(i)$ for a particular access bandwidth $Bw(i)$, $$t_l(i) = \sum_{j=1}^{N} t_l(i, j) \qquad \text{Equation 4}$$

For a given interval $\tau$ (e.g., a month or year), the fraction of access bandwidth lost, $F(i)$ for a particular access bandwidth type $Bw(i)$ due to outages in Access Routers is given by $$F(i) = \frac{1}{\tau n(i)} \sum_l t_l(i) \qquad \text{Equation 5}$$

The fraction of the total access bandwidth lost for all speeds of access due to outages of Access Routers is given by, $$F_{access} = \sum_{i=1}^{M} \frac{n(i)Bw(i)}{TAB} F(i) \qquad \text{Equation 6}$$

The accessibility DPM for the whole network is given by $$\text{DPM(accessibility)} = 10^6 \cdot F_{access} \qquad \text{Equation 7}$$

The existence of at least one available route between source and destination ARs under condition that the source AR is accessible is referred to as continuity. The probability that there is an available route from ARj to ARk under the condition that ARj is accessible to at least one of its customers is denote by $c(j,k)$. Assume that all routes $(j,k)$ are uniformly used in the network. Then, the average continuity, or the probability of continuity for the whole network is $$c = \frac{\sum_j \sum_{k \ne j} c(j, k)}{N(N-1)} \qquad \text{Equation 8}$$

Note that $c(j,k)$ is not equal to $c(k,j)$ because of the condition on accessibility.

The loss of continuity, is given by the probability $1-c$, whose estimate is $$f = \frac{\sum_j \sum_{k \ne j} f(j, k)}{N(N-1)} \qquad \text{Equation 9}$$

where $f(j,k)$ is the fraction of time during which there is no route from ARj to ARk while ARj is accessible to at least one of its customers. In other words, it is a result of the measurement of route availability to be deployed.

The DPM in continuity can be calculated as $$\text{DPM(continuity)} = 10^6 \cdot f \qquad \text{Equation 10}$$

An estimate of the availability of the network can be obtained by the processor 206 of FIG. 3 from the accessibility and continuity of the network established by the accessibility measurement device 202 and the continuity measurement device 204, respectively. A customer finds the network available if the network is accessible to the customer and if the network can transport the packets from access to egress points of the backbone. The availability is defined as a probability of a joint event that the network is accessible and continuous, or:

$$P(\text{availability}) = P(\text{accessibility and continuity}) = P(\text{accessibility}) \cdot P(\text{continuity}|\text{accessibility}) \qquad \text{Equations 11}$$

where $P(\text{continuity}|\text{accessibility})$ is the conditional probability of continuity given accessibility. In other words, the unavailability is given by $$\begin{aligned} P(\text{unavailability}) &= P(\text{not\_accessible OR} \\ &\quad \text{accessible\_but\_not\_continuous}) \\ &= P(\text{not\_accessible}) + \\ &\quad P(\text{accessible\_but\_not\_continuous}) \end{aligned} \qquad \text{Equation 12}$$

Using Eq. 12, the fraction $F_{net}$ of the total access bandwidth lost due to all outages in the network can be calculated as $$F_{net} = F_{access} + (1 - F_{access}) f \qquad \text{Equation 13}$$

Finally, from Eqn. 13, the availability DPM is given by $$\text{DPM(availability)} = 10^6 \cdot F_{net} = \text{DPM(accessibility)} + \text{DPM(continuity)}(1 - F_{access}) \qquad \text{Equation 14}$$

The additive nature of the defects is clearly seen in this equation. Since $F_{access}$ is typically of the order of $10^{-4}$, thus, $$\text{DPM(availability)} \approx \text{DPM(accessibility)} + \text{DPM(continuity)} \qquad \text{Equation 15}$$

It is the DPM (availability) that is the unavailable customer bandwidth determined by the processor 206 of FIG. 3.

For Internet availability, the case is slightly different. To determine Internet availability, consider route pairs between the access routers 104 and 108 in FIG. 2 and one or more Internet Gateway Routers (IGRs) (not shown). To understand the differences, consider the following new parameters and different interpretation for parameters defined before.

P is the total number of Internet gateway routers (IGRs).

$f(j,k)$ is the fraction of time that there is no route between ARj (one access router such as 104) and IGRk The existence of at least one available route between the access router (e.g. 104 and 108) and a given IGR router under condition that the source AR router is accessible is referred to as continuity in the Internet case. The probability that there is an available route between ARj and IGRk under the condition that ARj is accessible to at least one of its customers is denoted by c(j,k). Assume that all routes (j,k) are uniformly used in the network. Then, the average Internet continuity, or the probability of Internet continuity for the whole network is $$c_I = \frac{\sum_{j=1}^{N}\sum_{k=1}^{P} c(j,k)}{NP} \quad \text{Equation 16}$$

The loss of continuity is given by the probability, $1-c_I$, whose estimate is $$f_I = \frac{\sum_{j=1}^{N}\sum_{k=1}^{P} f(j,k)}{NP} \quad \text{Equation 17}$$

where f(j,k) is defined previously.
The Internet continuity DPM is given by $$DPM(\text{internet\_continuity}) = 10^6 \cdot f_I \quad \text{Equation 18}$$

The Internet availability measures the ability of a customer to reach the Internet. Thus, in this case, the accessibility of a customer to an Intranet backbone network (Intranet accessibility) is combined with the ability to reach the IGRs (Internet continuity). With the above definitions of Intranet accessibility and Internet continuity, the final form of the Internet availability DPM is expressed similarly to equations 13 and 14 for Intranet availability. Or $$F_{Internet} = F_{access} + (1 - F_{access})f_I \quad \text{Equation 19}$$

This implies that $$DPM(\text{Internet\_availability}) = 10^6 \cdot F_{Internet} \quad \text{Equation 20}$$
$$= DPM(\text{accessibility}) + (1 - F_{access})DPM(\text{Internet\_continuity})$$

The additive nature of the defects is clearly seen in Eq. 20 since $F_{access}$ is typically of the order of $10^{-4}$.

From the relationships given above, the accessibility measurement instrumentation device 202 and the continuity measurement instrumentation device 204 can readily establish the customer accessibility and customer continuity Defects Per Million. From the accessibility and continuity DPM measurements, the processor 206 can establish the customer network availability Defects Per Million, thus providing a measure of actual unavailable customer bandwidth. By comparing actual unavailable customer bandwidth to that specified in an applicable service level agreement, the processor 206 can determine whether to take appropriate action to restore bandwidth.

A measure of IGR accessibility can be defined similar to that of AR accessibility. It is not used in the definition of Internet availability, but may be used as a tracking metric for IGR outage.

The above-described embodiments merely illustrate the principles of the invention. Those skilled in the art may make various modifications and changes that will embody the principles of the invention and fall within the spirit and scope thereof.

What is claimed is:

1. A method for determining unavailable customer bandwidth in a connectionless data network receiving data packets from customer routers and for restoring bandwidth when the unavailable customer bandwidth exceeds a prescribed level, comprising the steps of:

establishing a quantitative accessibility measurement indicative of the inability of the network to accept data packets from customer routers at an ingress point of the connectionless network;

establishing a quantitative continuity measurement indicative of the inability of the network to deliver data packets from the ingress point of the network to a network egress point;

determining actual service unavailability of the network as a joint function of the quantitative accessibility measurement and the quantitative continuity measurement;

comparing the actual service unavailability to a threshold service unavailability; and restoring the network when the actual service unavailability exceeds the threshold unavailability, wherein the accessibility measurement is made by establishing the total outage time for customers of Bandwidth Bw(i) divided by the number of customers with that said bandwidth multiplied by a prescribed time interval.

2. A method for determining unavailable customer bandwidth in a connectionless data network receiving data packets from customer routers and for restoring bandwidth when the unavailable customer bandwidth exceeds a prescribed level, comprising the steps of:

establishing a quantitative accessibility measurement indicative of the inability of the network to accept data packets from customer routers at an ingress point of the connectionless network;

establishing a quantitative continuity measurement indicative of the inability of the network to deliver data packets from the ingress point of the network to a network egress point;

determining actual service unavailability of the network as a joint function of the quantitative accessibility measurement and the quantitative continuity measurement;

comparing the actual service unavailability to a threshold service unavailability; and restoring the network when the actual service unavailability exceeds the threshold unavailability;

wherein the service unavailability is determined as a function of the sum of the accessibility and continuity measurements.

3. A method for determining unavailable customer bandwidth in a connectionless data network receiving data packets from customer routers and for restoring bandwidth when the unavailable customer bandwidth exceeds a prescribed level, comprising the steps of:

establishing a quantitative accessibility measurement indicative of the inability of the network to accept data packets from customer routers at an ingress point of the connectionless network;

establishing a quantitative continuity measurement indicative of the inability of the network to deliver data packets from the ingress point of the network to a network egress point;

determining actual service unavailability of the network as a joint function of the quantitative accessibility measurement and the quantitative continuity measurement;

comparing the actual service unavailability to a threshold service unavailability; and restoring the network when the actual service unavailability exceeds the threshold unavailability, wherein the step of restoring the network includes the steps of: receiving network fault and performance alarms, correlating the actual service unavailability and network fault and performance alarms to a root cause of such service unavailability; and issuing a notification of such root cause.

4. The method according to claim 3 wherein the step of issuing a notification includes the step of printing a trouble ticket.

5. The method according to claim 3 further including the step of tracking such root cause notifications.

6. A method for determining unavailable customer bandwidth in a connectionless data network receiving data packets from customer routers and for restoring bandwidth when the unavailable customer bandwidth exceeds a prescribed level, comprising the steps of:

establishing a quantitative accessibility measurement indicative of the inability of the network to accept data packets from customer routers at an ingress point of the connectionless network;

establishing a quantitative continuity measurement indicative of the inability of the network to deliver data packets from the ingress point of the network to a network egress point;

determining actual service unavailability of the network as a joint function of the quantitative accessibility measurement and the quantitative continuity measurement;

comparing the actual service unavailability to a threshold service unavailability; and restoring the network when the actual service unavailability exceeds the threshold unavailability, further including the step of providing an indication when the service unavailability does not exceed the threshold unavailability.

7. A method for determining unavailable customer bandwidth in a connectionless data network receiving data packets from customer routers and for restoring bandwidth when the unavailable customer bandwidth exceeds a prescribed level, comprising the steps of:

establishing a quantitative accessibility measurement indicative of the inability of the network to accept data packets from customer routers at an ingress point of the connectionless network;

establishing a quantitative continuity measurement indicative of the inability of the network to deliver data packets from the ingress point of the network to a network egress point;

determining actual service unavailability of the network as adjoint function of the quantitative accessibility measurement and the quantitative continuity measurement;

comparing the actual service unavailability to a threshold service unavailability; restoring the network when the actual service unavailability exceeds the threshold unavailability by (1) receiving network fault and performance alarms, (2) correlating the actual service unavailability and network fault and performance alarms to a root cause of such service unavailability; and (3) issuing a notification of such root cause to facilitate at least one of repair, adjustment, modification and enhancement to the network.

8. The method according to claim 7 wherein the step of issuing a notification includes the step of printing a trouble ticket.

9. The method according to claim 7 further including the step of tracking such root cause notifications.

10. The method according to claim 7 further including the step of providing an indication when the service unavailability does not exceed the threshold unavailability.

11. Apparatus for determining unavailable customer bandwidth in a connectionless data network receiving data packets from customer routers and for facilitating bandwidth restoration when the unavailable customer bandwidth exceeds a prescribed level, comprising:

means for establishing a quantitative accessibility measurement indicative of the inability of the network to accept data packets from customer routers to an ingress point of the connectionless network;

means for establishing a quantitative continuity measurement indicative of the inability of the network to deliver of data packets from the ingress point of the network to a network egress point;

means for determining actual service unavailability of the network as a joint function of the quantitative accessibility measurement and the quantitative continuity measurement; and means for comparing the actual service unavailability to a threshold service unavailability: and for providing an indication when the actual service unavailability exceeds the threshold unavailability wherein said accessibility measurement is a function of the fraction of the total access bandwidth lost for all speeds of access due to outages of access routers in the network.

12. The invention of claim 11 wherein said continuity measurement is a function of a fraction of time during which there is no route through the network between pairs of ingress points and egress points.

13. The invention of claim 12 wherein said service unavailability is a function of the sum of said accessibility measurement and said continuity measurement.

14. A method for determining unavailable customer bandwidth in a connectionless data network receiving data packets from customer routers and for restoring bandwidth when the unavailable customer bandwidth exceeds a prescribed level, comprising the steps of:

establishing a quantitative accessibility measurement indicative of the inability of the network to accept data packets from customer routers at an ingress point of the connectionless network;

establishing a quantitative continuity measurement indicative of the inability of the network to deliver data packets from the ingress point of the network to a network egress point; and determining actual service unavailability of the network as a joint function of the quantitative accessibility measurement and the quantitative continuity measurement, wherein said continuity measurement is a function of a fraction of time during which there is no route through the network between pairs of ingress points and egress points.

15. The invention of claim 14 wherein said accessibility measurement is a function of the fraction of the total access bandwidth lost for all speeds of access due to outages of access routers in the network.

16. The invention of claim 15 wherein said service unavailability is a function of the sum of said accessibility measurement and said continuity measurement.

* * * * *